United States Patent
Hayashida et al.

(10) Patent No.: US 11,167,380 B2
(45) Date of Patent: Nov. 9, 2021

(54) FLUX FOR SOLDER PASTE AND SOLDER PASTE

(71) Applicant: SENJU METAL INDUSTRY CO., LTD., Tokyo (JP)

(72) Inventors: Toru Hayashida, Tokyo (JP); Rina Horikoshi, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 17/059,435

(22) PCT Filed: May 28, 2019

(86) PCT No.: PCT/JP2019/021024
§ 371 (c)(1),
(2) Date: Nov. 28, 2020

(87) PCT Pub. No.: WO2019/230694
PCT Pub. Date: Dec. 5, 2019

(65) Prior Publication Data
US 2021/0213569 A1    Jul. 15, 2021

(30) Foreign Application Priority Data
Jun. 1, 2018    (JP) .............................. JP2018-106468

(51) Int. Cl.
*B23K 35/362* (2006.01)
*B23K 35/02* (2006.01)
*B23K 35/26* (2006.01)
*B23K 35/36* (2006.01)
*C22C 13/00* (2006.01)

(52) U.S. Cl.
CPC .......... *B23K 35/362* (2013.01); *B23K 35/025* (2013.01); *B23K 35/262* (2013.01); *B23K 35/3613* (2013.01); *C22C 13/00* (2013.01)

(58) Field of Classification Search
None
See application file for complete search history.

(56) References Cited

U.S. PATENT DOCUMENTS

| | | | |
|---|---|---|---|
| 7,004,375 B2 * | 2/2006 | Shah .................... | C08L 71/00 228/215 |
| 2003/0221748 A1 * | 12/2003 | Arzadon ............ | B23K 35/0244 148/23 |
| 2014/0083567 A1 * | 3/2014 | Hamagawa ............ | B23K 35/02 148/24 |
| 2018/0200845 A1 * | 7/2018 | Kawanago ........... | B23K 35/362 |
| 2018/0339375 A1 * | 11/2018 | Maruko ............... | B23K 35/262 |
| 2019/0030656 A1 | 1/2019 | Nishizaki et al. | |

FOREIGN PATENT DOCUMENTS

| | | |
|---|---|---|
| CN | 1671506 | 9/2005 |
| CN | 102179644 A * | 9/2011 |
| CN | 104364046 | 2/2015 |
| CN | 106271186 A * | 1/2017 |
| CN | 106514057 A * | 3/2017 |
| CN | 107363436 A * | 11/2017 |
| CN | 107570911 | 1/2018 |
| JP | 2013-169557 | 9/2013 |
| JP | 2016-093816 | 5/2016 |
| JP | 2016-167561 | 9/2016 |
| WO | WO-2017/122341 A1 | 7/2017 |
| WO | WO-2017/122750 A1 | 7/2017 |

OTHER PUBLICATIONS

CN-107363436-A—translation.*
International Search Report for App. No. PCT/JP2019/021024, dated Aug. 20, 2019.
China Office Action for Application No. 201980035294.2, dated Apr. 9, 2021.

* cited by examiner

*Primary Examiner* — Devang R Patel
(74) *Attorney, Agent, or Firm* — Nixon Peabody LLP; Jeffrey L. Costellia

(57) ABSTRACT

Provided are: a flux that is for a solder paste and that can inhibit occurrence of voids; and a solder paste using the flux. This flux for a solder paste contains rosin, an imidazole compound, and a solvent, wherein the contained amount of the imidazole compound is 25-35 mass %. The flux also contains 0-20 mass % of a block organic acid and 0-3 mass % of an activator.

8 Claims, No Drawings

FLUX FOR SOLDER PASTE AND SOLDER PASTE

TECHNICAL FIELD

The present invention relates to a flux for a solder paste used for soldering and a solder paste using this flux.

BACKGROUND ART

Generally, fluxes used for soldering have efficacy of chemically removing a metal oxide present between a solder and the metallic surface of an object to be joined, which is an object of soldering, and of enabling the movement of a metal element in the boundary between the solder and the object. Therefore, soldering using the flux allows the formation of an intermetallic compound between the solder and the metallic surface of the object to be joined, and strong joining can be obtained.

A solder paste is a composite material obtained by mixing the powder of a solder alloy and a flux. In soldering using the solder paste, the solder paste is printed on the soldering part of an electrode or the like on a substrate, a component is mounted on the soldering part on which the solder paste is printed, and the substrate is heated in a heating furnace called a reflow furnace to melt the solder, thereby carrying out the soldering.

When an attempt is made to increase the activity of the flux in order to improve the solderability of the solder paste, a highly active component such as an activator and the solder react with each other while the solder paste is preserved. Therefore, the viscosity of the solder paste increases, and there is a tendency that the preservation stability of the solder paste degrades. Therefore, in order to satisfy both the solderability and the preservation stability, there has been proposed a solder paste containing an imidazole compound added by adding an organic acid as an activator to a flux (vehicle) (refer to, for example, Patent Literature 1).

In contrast, in the soldering using the solder paste, there is a problem in that, in the hardened solder paste, air bubbles called voids remain. The solder paste described in Patent Literature 1 improves the solderability and the preservation stability, but is not capable of sufficiently suppressing the generation of voids.

Therefore, an attempt is underway to suppress voids by increasing the activity of the flux, and, as a method of increasing the activity of the flux, there has been proposed a flux containing a halogen compound (refer to, for example, Patent Literature 2).

CITATION LIST

Patent Literature

[Patent Literature 1]
Japanese Unexamined Patent Application, First Publication No. 2013-169557
[Patent Literature 2]
Japanese Unexamined Patent Application, First Publication No. 2016-93816

SUMMARY OF INVENTION

Technical Problem

However, as the demand for reducing voids becomes stricter, the conventional method of improving the activity by adding an organic acid or a halogen compound is no longer capable of sufficiently suppressing the generation of voids.

The present invention has been made to solve the above-described problem, and an object of the present invention is to provide a flux for a solder paste capable of suppressing the generation of voids and a solder paste using the flux.

Solution to Problem

It was found that, in a solder paste including a flux and a metal powder, when a predetermined amount of an imidazole compound is added to the flux, it is possible to suppress the generation of voids without impairing the tackiness of the solder paste.

Therefore, the present invention is a flux for a solder paste including rosin, an imidazole compound, and a solvent, in which 25% by mass or more and 35% by mass or less of the imidazole compound is included.

The flux for a solder paste of the present invention preferably includes 15% by mass or more and 40% by mass or less of rosin and 15% by mass or more and 35% by mass or less of the solvent. In addition, the flux for a solder paste preferably includes 0% by mass or more and 20% by mass of a block organic acid and 0% by mass or more and 3% by mass or less of an activator.

The flux for a solder paste of the present invention preferably further includes 0% by mass or more and 10% by mass or less of a thixotropic agent, preferably further includes 0% by mass or more and 5% by mass or less of an antifoaming agent, and preferably further includes 0% by mass or more and 5% by mass or less of an antioxidant.

In addition, the present invention is a solder paste including the above-described flux for a solder paste and a metal powder.

Advantageous Effects of Invention

The flux for a solder paste of the present invention includes 25% by mass or more of an imidazole compound, and thus the generation of voids can be suppressed during soldering carried out in a reflow furnace using a solder paste containing this flux and a metal powder. In addition, it is possible to provide tackiness to the solder paste.

DESCRIPTION OF EMBODIMENTS

<Example of Flux for Solder Paste of Present Embodiment>

A flux for a solder paste of the present embodiment includes rosin, an imidazole compound, and a solvent. The flux for a solder paste of the present embodiment includes 25% by mass or more of the imidazole compound, which functions as an activator, whereby the imidazole compound is left, and an oxide removal effect is enhanced.

Therefore, when soldering is carried out in a reflow furnace using a solder paste including this flux and a metal powder, an oxide that generates voids is removed, and the generation of voids can be suppressed.

The temperature during reflow does not exceed the boiling point of the imidazole compound, but exceeds the melting point, and thus the imidazole compound melts. Once melting, the imidazole compound vaporizes until the pressure becomes equal to the pressure in the vapor pressure curve. Therefore, when the amount of the imidazole compound added is small, it is not possible to leave a sufficient amount of the imidazole compound during the reflow, and the removal of an oxide is impossible. As a result, voids are generated. In addition, the imidazole compound is solid at room temperature, and thus an increase in the content of the imidazole compound in the flux weakens the tackiness of the solder paste. Therefore, the flux for a solder paste of the present embodiment includes 25% by mass or more and 35% by mass or less of the imidazole compound.

As the imidazole compound, imidazole, 2-ethylimidazole, 2-methylimidazole, 2-undecylimidazole, 2-heptadecylimidazole, 1,2-dimethylimidazole, 2-ethyl-4-methylimidazole, 2-phenylimidazole, 4-methyl-2-phenylimidazole, 1-benzyl-2-methylimidazole, 1-benzyl-2-phenylimidazole, and the like are exemplified.

Additionally, the flux for a solder paste may include, in addition to the imidazole compound, an activator and a block organic acid obtained by reacting an alkyl vinyl ether with a carboxy group. The block organic acid included suppresses the reaction between the imidazole compound and a carboxy group and is capable of suppressing an increase in the viscosity of the solder paste.

As the block organic acid, a compound having a hemiacetal ester structure obtained by reacting an organic acid and an alkyl vinyl ether and the like are exemplified.

When heated, the block organic acid is separated into an organic acid and an alkyl vinyl ether. Therefore, the block organic acid potentially has a function of an activator before heated and functions as an activator during soldering.

As the organic acid used for the block organic acid, glutaric acid, adipic acid, azelaic acid, eicosanedioic acid, citric acid, glycolic acid, succinic acid, salicylic acid, diglycolic acid, dipicolinic acid, dibutylaniline diglycolic acid, suberic acid, sebacic acid, thioglycolic acid, terephthalic acid, dodecanedioic acid, parahydroxyphenylacetic acid, picolinic acid, phenylsuccinic acid, phthalic acid, fumaric acid, maleic acid, malonic acid, lauric acid, benzoic acid, tartaric acid, tris(2-carboxyethyl) isocyanurate, glycine, 1,3-cyclohexanedicarboxylic acid, 2,2-bis(hydroxymethyl)propionic acid, 2,2-bis(hydroxymethyl)butanoic acid, 2,3-dihydroxybenzoic acid, 2,4-diethylglutaric acid, 2-quinolinecarboxylic acid, 3-hydroxybenzoic acid, malic acid, p-anisic acid, stearic acid, 12-hydroxystearic acid, and the like are exemplified.

As the alkyl vinyl ether used for the block organic acid, ethyl vinyl ether, propyl vinyl ether, isopropyl vinyl ether, butyl vinyl ether, isobutyl vinyl ether, 2-ethylhexyl vinyl ether, cyclohexyl vinyl ether, and the like are exemplified.

The flux for a solder paste of the present embodiment includes 0% by mass or more and 20% by mass or less of the block organic acid.

Furthermore, the flux for a solder paste may include, in addition to the imidazole compound, an organic acid or a halogen compound that functions as an activator. The organic acid or the halogen compound functions as an activator together with the imidazole compound, whereby the oxide removal effect is enhanced.

As the organic acid, glutaric acid, adipic acid, azelaic acid, eicosanedioic acid, citric acid, glycolic acid, succinic acid, salicylic acid, diglycolic acid, dipicolinic acid, dibutylaniline diglycolic acid, suberic acid, sebacic acid, thioglycolic acid, terephthalic acid, dodecanedioic acid, parahydroxyphenylacetic acid, picolinic acid, phenylsuccinic acid, phthalic acid, fumaric acid, maleic acid, malonic acid, lauric acid, benzoic acid, tartaric acid, tris(2-carboxyethyl) isocyanurate, glycine, 1,3-cyclohexanedicarboxylic acid, 2,2-bis(hydroxymethyl)propionic acid, 2,2-bis(hydroxymethyl)butanoic acid, 2,3-dihydroxybenzoic acid, 2,4-diethylglutaric acid, 2-quinolinecarboxylic acid, 3-hydroxybenzoic acid, malic acid, p-anisic acid, stearic acid, 12-hydroxystearic acid, oleic acid, linoleic acid, linolenic acid, and the like are exemplified.

As the halogen compound, 1-bromo-2-propanol, 3-bromo-1-propanol, 3-bromo-1,2-propanediol, 1-bromo-2-butanol, 1,3-dibromo-2-propanol, 2,3-dibromo-1-propanol, 1,4-dibromo-2-butanol, 2,3-dibromo-1,4-butanediol, trans-2,3-dibromo-2-butene-1,4-diol, and the like are exemplified.

The flux for a solder paste of the present embodiment includes 0% by mass or more and 3% by mass or less of the activator.

In addition, the flux for a solder paste of the present embodiment includes 15% by mass or more and 40% by mass or less of rosin and 15% by mass or more and 35% by mass or less of a solvent. The flux for a solder paste of the present embodiment further includes 0% by mass or more and 10% by mass or less of a thixotropic agent. The flux for a solder paste of the present embodiment may further include 0% by mass or more and 5% by mass or less of an antifoaming agent and 0% by mass or more and 5% by mass or less of an antioxidant as additives.

As the rosin, for example, raw material rosin such as gum rosin, wood rosin, and tall oil rosin, and derivatives obtained from the raw material rosin are exemplified. As the derivatives, for example, purified rosin, hydrogenated rosin, disproportionated rosin, polymerized rosin, acid-modified rosin, phenol-modified rosin and $\alpha,\beta$-unsaturated carboxylic acid-modified substances (acrylated rosin, maleated rosin, fumarate rosin, and the like), the purified substances, hydrides, and disproportionated substances of the polymerized rosin, the purified substances, hydrides, and disproportionated substances of the $\alpha,\beta$-unsaturated carboxylic acid, and the like are exemplified.

As the solvent, an alcohol-based solvent, a glycol ether-based solvent, terpineols, and the like are exemplified. As the alcohol-based solvent, isopropyl alcohol, 1,2-butanediol, isobornyl cyclohexanol, 2,4-diethyl-1,5-pentanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 2-methylpentane-2,4-diol, 1,1,1-tris(hydroxymethyl)propane, 2-ethyl-2-hydroxymethyl-1,3-propanediol, 2,2'-oxybis(methylene)bis(2-ethyl-1,3-propanediol), 2,2-bis(hydroxymethyl)-1,3-propanediol, 1,2,6-trihydroxyhexane, 1-ethynyl-1-cyclohexanole, 1,4-cyclohexanediol, 1,4-cyclohexanedimethanol, 2,4,7,9-tetramethyl-5-decyne-4,7-diol, and the like are exemplified. As the glycol ether-based solvent, diethylene glycol mono-2-ethylhexyl ether, ethylene glycol monophenyl ether, diethylene glycol monohexyl ether, diethylene glycol dibutyl ether, triethylene glycol monobutyl ether, methyl propylene triglycol, butyl propylene triglycol, triethylene glycol butyl methyl ether, tetraethylene glycol dimethyl ether, and the like are exemplified.

As the thixotropic agent, a wax-based thixotropic agent and an amide-based thixotropic agent are exemplified. As the wax-based thixotropic agent, for example, hydrogenated castor oil and the like are exemplified. As the amide-based thixotropic agent, lauric amide, palmitic amide, stearic amide, behenic amide, hydroxystearic amide, saturated fatty acid amide, oleic amide, erucic amide, unsaturated fatty acid amide, p-toluenemethane amide, aromatic amide, methylenebisstearic amide, ethylenebislauric amide, ethylenebishydroxystearic amide, saturated fatty acid bisamide, methylenebisoleic amide, unsaturated fatty acid bisamide, m-xylylenebisstearic amide, aromatic bisamide, saturated fatty acid polyamide, unsaturated fatty acid polyamide, aromatic polyamide, substituted amide, methylol stearic amide, methylol amide, fatty acid ester amide, and the like are exemplified.

As the antifoaming agent, an acrylic polymer, a vinyl ethanol polymer, a butadiene polymer, silicone, and the like are exemplified. In addition, as the antioxidant, a hindered phenolic antioxidant and the like are exemplified.

<Example of Solder Paste of Present Embodiment>

A solder paste of the present embodiment includes the above-described flux for a solder paste and a metal powder. The metal powder is preferably a solder not including Pb and is made of pure Sn; a Sn—Ag-based alloy, a Sn—Cu-based alloy, a Sn—Ag—Cu-based alloy, a Sn—Bi-based alloy, a Sn—In-based alloy, or the like; or the powder of a solder obtained by adding Sb, Bi, In, Cu, Zn, As, Ag, Cd, Fe, Ni, Co, Au, Ge, P, or the like to the above-described alloy.

<Example of Action and Effect of Flux for Solder Paste and Solder Paste of Present Embodiment>

In the flux for a solder paste including at least rosin, the imidazole compound, and the solvent and including 25% by mass or more and 35% by mass or less of the imidazole compound and the solder paste using this flux, the imidazole compound that functions as an activator sufficiently remains until a solder melts, and the oxide removal effect is enhanced in a desired temperature range. Therefore, the oxide that generates voids is removed, and the generation of voids can be suppressed.

EXAMPLES

Fluxes for a solder paste of examples and comparative examples were prepared according to the compositions shown in Table 1 below, solder pastes were prepared using these fluxes, and the void suppression capability and the tackiness were verified. The composition fractions in Table 1 are "% by mass" in a case where the total amount of the flux is set to 100.

The solder paste included 11% by mass of the flux and 89% by mass of a metal powder. In addition, the metal powder in the solder paste was a Sn—Ag—Cu-based solder alloy including 3.0% by mass of Ag, 0.5% by mass of Cu, and the remainder of Sn, and the grain size of the metal powder was 20 μm to 38 μm.

<Evaluation of Void Suppression Capability>

(1) Verification Method

For the evaluation of the void suppression capability, the solder paste for which the flux described in each of the examples and the comparative examples was used was printed on an electrode on a substrate. The print thickness was 0.15 mm. After the printing of the solder paste, a 3.2 mm×1.6 mm chip resistance component was placed on the solder paste, and reflow was carried out. Regarding the reflow conditions, preliminary heating was carried out in a $N_2$ atmosphere at 150° C. to 200° C. for 118 seconds, and then main heating was carried out at 220° C. or higher for 42 seconds with the peak temperature set to 247° C. After the reflow, the component-mounted part was captured with an X-ray observation device (XVR-160 manufactured by Uni-Hite System Corporation), and the void area fraction was computed from Expression (1) by assigning the number of pixels in the entire fillet portion in the X-ray transmission image as the denominator and the number of pixels in a void part as the numerator. (Total number of pixels in void part/number of pixels in entire electrode part)×100(%) (1)

(2) Determination Standards

O: Void area fraction≤5%

X: Void area fraction>5%

<Evaluation of Tackiness>

Because the imidazole compound is solid at room temperature, an increase in the content of the imidazole compound in the flux weakens the tackiness of the solder paste. The solder paste is demanded to have tackiness high enough to hold components to be mounted, and thus the tackiness was evaluated.

(1) Verification Method

Verification was carried out in accordance with test methods for tackiness of JIS Z3284-3. A tackiness tester TACII manufactured by RESCA Corporation Limited was used in the tackiness test.

(2) Determination Standards

O: Tackiness ≥1 $N/m^2$

X: Tackiness <1 $N/m^2$

TABLE 1

| | Compound | Example 1 | Example 2 | Example 3 | Example 4 | Example 5 | Example 6 | Example 7 | Example 8 | Example 9 | Comparative Example 1 | Comparative Example 2 |
|---|---|---|---|---|---|---|---|---|---|---|---|---|
| Rosin | Acid-modified rosin | 30 | 30 | 25 | 35 | 30 | 28 | 20 | 27 | 27 | 25 | 20 |
| Activator (organic acid) | Maleic acid | 1 | 1 | 1 | 1 | | | | | | | |
| Block agent (block organic acid) | Dialkyl vinyl ether | 15 | 15 | 15 | 10 | 20 | 15 | 15 | 15 | 10 | | |
| Imidazole | 2-Ethylimidazole | 25 | 30 | 35 | 30 | 35 | 30 | 30 | 25 | 25 | 20 | 40 |
| Thixotropic agent | Hydrogenated castor oil | 5 | 5 | 5 | 5 | 5 | 5 | 5 | 5 | 5 | 5 | 5 |
| Antifoaming agent | Butadiene polymer | | 6 | | | | | | | | | |
| Antioxidant | Hindered phenolic antioxidant | | | 5 | | | | | | | | |
| Solvent | Diethylene glycol monohexyl ether | 25 | 20 | 20 | 30 | 29 | 26 | 25 | 21 | 22 | 35 | 25 |

TABLE 1-continued

| Compound | Example 1 | Example 2 | Example 3 | Example 4 | Example 5 | Example 6 | Example 7 | Example 8 | Example 9 | Comparative Example 1 | Comparative Example 2 |
|---|---|---|---|---|---|---|---|---|---|---|---|
| Void | ○ | ○ | ○ | ○ | ○ | ○ | ○ | ○ | ○ | X | ○ |
| Tackiness | ○ | ○ | ○ | ○ | ○ | ○ | ○ | ○ | ○ | ○ | X |

In the present invention, as shown in Examples 1 to 3, from the fluxes for a solder paste including 25% by mass or more and 35% by mass or less of 2-ethylimidazole as the imidazole compound and 15% by mass of dialkyl vinyl ether, which is a hemiacetal ester compound, as the block organic acid within the ranges specified by the present invention, sufficient effects were obtained for the void suppression capability and the tackiness. The rosin, the solvent, and the thixotropic agent were included within the ranges specified by the present invention, and thus the effect of the inclusion of the imidazole compound and the block organic acid was not impaired.

As the imidazole compound, other than 2-ethylimidazole, imidazole, 2-methylimidazole, 2-undecylimidazole, 2-heptadecylimidazole, 1,2-dimethylimidazole, 2-ethyl-4-methylimidazole, 2-phenylimidazole, 4-methyl-2-phenylimidazole, 1-benzyl-2-methylimidazole, 1-benzyl-2-phenylimidazole, or the like was included within the range specified by the present invention, and thus sufficient effects were obtained for the void suppression capability and the tackiness.

In addition, because the imidazole compound was included within the range specified by the present invention, even from the flux for a solder paste not including the organic acid and the block organic acid as shown in Example 4, the flux for a solder paste including maleic acid as the organic acid and not including the block organic acid as shown in Example 5, and the flux for a solder paste including the organic acid and the block organic acid as shown in Example 6, sufficient effects were obtained for the void suppression capability and the tackiness.

Furthermore, because the imidazole compound was included within the range specified by the present invention, even from the flux for a solder paste including 20% by mass of the block organic acid as shown in Example 7, sufficient effects were obtained for the void suppression capability and the tackiness.

In addition, because the imidazole compound was included within the range specified by the present invention, even from the flux for a solder paste including 5% by mass of the antifoaming agent as shown in Example 8, sufficient effects were obtained for the void suppression capability and the tackiness. Furthermore, because the imidazole compound was included within the range specified by the present invention, even from the flux for a solder paste including 5% by mass of the antioxidant as shown in Example 9, sufficient effects were obtained for the void suppression capability and the tackiness.

In contrast, as shown in Comparative Example 1, in the flux for a solder paste including the imidazole compound less than the range specified by the present invention, it was not possible to suppress voids although the block organic acid was included within the range specified by the present invention.

In addition, as shown in Comparative Example 2, in the flux for a solder paste including the imidazole compound more than the range specified by the present invention, the void suppression effect was obtained, but a desired tackiness was not obtained although the block organic acid was included within the range specified by the present invention.

The above-described facts show that, in the flux for a solder paste including the rosin, the imidazole compound, and the solvent and including 25% by mass or more and 35% by mass or less of the imidazole compound, the imidazole compound that functioned as an activator sufficiently remained until the solder melted, and the oxide removal effect was enhanced in a desired temperature range.

Therefore, in the solder paste for which the flux for a solder paste was used, an oxide that generates voids was removed, and it was possible to suppress the generation of voids.

In addition, even when the flux for a solder paste according to the present invention included 0% by mass or more and 20% by mass or less of the block organic acid, 0% by mass or more and 3% by mass or less of the organic acid as an activator, 15% by mass or more and 40% by mass or less of the rosin, 15% by mass or more and 35% by mass or less of the solvent, furthermore, 0% by mass or more and 10% by mass or less of the thixotropic agent, 0% by mass or more and 5% by mass or less of the antifoaming agent, and 0% by mass or more and 5% by mass or less of the antioxidant, the void suppression capability and the tackiness attributed to the inclusion of the imidazole compound were not impaired, and sufficient effects were obtained for the void suppression capability and the tackiness.

The invention claimed is:

1. A flux for a solder paste comprising:
   rosin;
   an imidazole compound; and
   a solvent,
   wherein 25% by mass or more and 35% by mass or less of the imidazole compound with respect to 100% by mass of the flux is included.

2. The flux for a solder paste according to claim 1,
   wherein 15% by mass or more and 40% by mass or less of the rosin, and
   15% by mass or more and 35% by mass or less of the solvent with respect to 100% by mass of the flux are included.

3. The flux for a solder paste according to claim 1 or 2, further comprising:
   0% by mass or more and 20% by mass or less of a block organic acid with respect to 100% by mass of the flux.

4. The flux for a solder paste according to any one of claims 1 to 3, further comprising:
   0% by mass or more and 3% by mass or less of an activator with respect to 100% by mass of the flux.

5. The flux for a solder paste according to any one of claims 1 to 4, further comprising:
   0% by mass or more and 10% by mass or less of a thixotropic agent with respect to 100% by mass of the flux.

6. The flux for a solder paste according to any one of claims 1 to 5, further comprising:

0% by mass or more and 5% by mass or less of an antifoaming agent with respect to 100% by mass of the flux.

7. The flux for a solder paste according to any one of claims 1 to 6, further comprising:

0% by mass or more and 5% by mass or less of an antioxidant with respect to 100% by mass of the flux.

8. A solder paste comprising:

the flux for a solder paste according to claim 1; and a metal powder.

\* \* \* \* \*